United States Patent
Loewe et al.

(10) Patent No.: US 9,482,208 B2
(45) Date of Patent: Nov. 1, 2016

(54) WIND TURBINE ROTOR BLADE HAVING AN ELECTRICAL HEATING ARRANGEMENT AND METHOD OF MAKING THE SAME

(71) Applicant: Nordex Energy GmbH, Hamburg (DE)

(72) Inventors: Astrid Loewe, Hamburg (DE); Oskar Renschler, Delingsdorf (DE); Philipp Rindt, Rostock (DE)

(73) Assignee: Nordex Energy GmbH, Hamburg (DE)

( * ) Notice: Subject to any disclaimer, the term of this patent is extended or adjusted under 35 U.S.C. 154(b) by 990 days.

(21) Appl. No.: 13/693,526

(22) Filed: Dec. 4, 2012

(65) Prior Publication Data

US 2013/0170992 A1 Jul. 4, 2013

(30) Foreign Application Priority Data

Dec. 7, 2011 (EP) ..................................... 11009663

(51) Int. Cl.
*F03D 11/00* (2006.01)
*F03D 1/06* (2006.01)

(52) U.S. Cl.
CPC .......... *F03D 11/0025* (2013.01); *F03D 1/0675* (2013.01); *F03D 80/40* (2016.05); *F05B 2230/00* (2013.01); *Y02E 10/721* (2013.01); *Y02E 10/722* (2013.01); *Y02P 70/523* (2015.11); *Y10T 29/49083* (2015.01)

(58) Field of Classification Search
CPC .. F03D 11/0025; F03D 1/0675; F03D 80/40; F05B 2230/00; B64D 15/12; Y10T 29/49083; Y02E 10/721; Y02E 10/722; Y02P 70/523
USPC ............................ 416/95, 229 R, 230, 229 A
See application file for complete search history.

(56) References Cited

U.S. PATENT DOCUMENTS

| | | | | |
|---|---|---|---|---|
| 4,737,618 A * | 4/1988 | Barbier | ..................... | H05B 3/06 219/520 |
| 5,947,418 A * | 9/1999 | Bessiere | ................ | B64D 15/14 219/545 |
| 5,971,323 A * | 10/1999 | Rauch | .................... | B64D 15/12 219/202 |
| 6,145,787 A | 11/2000 | Rolls | | |
| 6,612,810 B1 | 9/2003 | Olsen et al. | | |
| 7,157,663 B1 | 1/2007 | Kismarton | | |
| 2005/0189345 A1* | 9/2005 | Brunner | ................. | B64D 15/12 219/548 |
| 2013/0022466 A1* | 1/2013 | Laurberg | ............ | F03D 11/0025 416/95 |
| 2013/0028738 A1* | 1/2013 | Nordin | ................ | F03D 11/0025 416/39 |

FOREIGN PATENT DOCUMENTS

| WO | WO 03/058063 A1 | 7/2003 |
|---|---|---|
| WO | WO 2007/121501 A1 | 11/2007 |
| WO | WO 2011/127997 A1 | 10/2011 |
| WO | WO 2011/148049 A1 | 12/2011 |

* cited by examiner

*Primary Examiner* — Richard Edgar
*Assistant Examiner* — Jesse Prager
(74) *Attorney, Agent, or Firm* — Walter Ottesen, P.A.

(57) ABSTRACT

A wind turbine rotor blade is assembled from a first and a second rotor blade half shell made of a fiber-reinforced plastics material. An electrical heating arrangement includes a first heating element connected to the first rotor blade half shell and having a blade root end and a blade tip end and a second heating element connected to the second rotor blade half shell also having a blade root end and a blade tip end. The heating arrangement also includes a third heating element connected to the rotor blade half shells and having a blade root end and a blade tip end. The blade tip ends of the first, second and third heating elements are mutually electrically connected. The blade root ends of the first, second and third heating elements are connected to respective electrical connecting lines.

17 Claims, 5 Drawing Sheets

WIND TURBINE ROTOR BLADE HAVING AN ELECTRICAL HEATING ARRANGEMENT AND METHOD OF MAKING THE SAME

CROSS REFERENCE TO RELATED APPLICATION

This application claims priority of European patent application no. 11009663.3, filed Dec. 7, 2011, the entire content of which is incorporated herein by reference.

FIELD OF THE INVENTION

The invention relates to a wind turbine rotor blade which includes a fiber-reinforced plastics material and an electrical heating arrangement having electrical connections at a blade root end. The invention also relates to a method of making the wind turbine rotor blade.

BACKGROUND OF THE INVENTION

Wind turbines are erected preferably at locations having high wind speeds which are as constant as possible. Low temperatures frequently prevail at such locations, and so ice can form on the rotor blades under particular weather conditions. The development of ice on the rotor blades impairs the operation of the wind turbine. Therefore, ice warning systems or deicing systems are used in cold regions.

An ice warning system ensures that the wind turbine is shut down as a preventive measure under the relevant weather conditions. This results in losses in terms of yield. A deicing system prevents ice crystals from forming on the rotor blades. Thus, a deicing system makes it possible to leave the wind turbine in operation and to reduce or even avoid losses in terms of yield.

It is known from the state of the art to install heating elements on the external surface of the rotor blades of a wind turbine. Heating elements are preferably installed in regions close to the center of the blade up to the blade tip, where the formation of ice crystals impairs the aerodynamic effectiveness of the wind turbine rotor blades and is thus disruptive. Such heating elements are connected to an electrical energy source of the wind turbine via electrical lines which lead to the rotor blade root from a blade tip end and from a blade root end of the heating element, which electrical lines are made of conventional cables.

The publication WO 2011/127997 A1 discloses arranging a heating mat, which runs in the form of a loop, on the outer side of a wind turbine rotor blade. The electrical connections of the heating mat are located at the two free ends of the loop-shaped heating mat close to the blade root. From there, a first section and a second section of the heating mat each lead to the blade tip. At the blade tip, the heating mat is redirected, so that the two sections merge into each other in a transition region. In one exemplary embodiment, the two sections of the heating mat overlap each other along a leading edge of the rotor blade. In another exemplary embodiment, the heating mat has a third section which can have a further electrical connection close to the blade root. In the known solution, it is not necessary to lead electrical connecting lines to a blade tip end of the heating mat. This is intended to reduce the risk of a lightning strike.

SUMMARY OF THE INVENTION

Based on the above, it is the object of the invention to provide a wind turbine rotor blade including an electrical heating arrangement having electrical connections at a blade root end. The wind turbine rotor blade can be produced more easily and generates a heat output in line with demand. It is another object of the invention to provide a method of making the wind turbine rotor blade.

The wind turbine rotor blade is made of a fiber-reinforced plastics material and has an electrical heating arrangement having electrical connections at a blade root end. It is assembled from a first rotor blade half shell and a second rotor blade half shell made of a fiber-reinforced plastics material. The electrical heating arrangement includes the following:

a first heating element which has a blade root end and a blade tip end and, during the production of the first rotor blade half shell, was embedded in a plastics matrix contemporaneously with reinforcement fibers of the first rotor blade half shell by curing a liquid plastics material;

a second heating element which has a blade root end and a blade tip end and, during the production of the second rotor blade half shell, was embedded in a plastics matrix contemporaneously with reinforcement fibers of the second rotor blade half shell by curing a liquid plastics material;

a third heating element which is connected to the first rotor blade half shell and to the second rotor blade half shell and has a blade root end and a blade tip end;

the blade tip ends of the first, second and third heating elements being connected together in an electrically conductive manner; and, the blade root ends of the first, second and third heating elements each being connected to corresponding electrical connecting lines.

The wind turbine rotor blade can for example be provided for a wind turbine having a rotor having a substantially horizontal axis. The rotor can have a rotor hub, to which for example two, three or more wind turbine rotor blades are fastened. To this end, each wind turbine rotor blade can have a fastening flange in the region of the blade root.

Each of the three heating elements can be arranged substantially in a longitudinal direction of the rotor blade and between the blade root end and the blade tip end thereof can have a length of for example at least 30%, at least 50% or at least 70% of the overall length of the wind turbine rotor blade. The blade tip ends of the heating elements can be arranged at a distance from the blade tip. The blade root ends of the heating elements can be arranged at a distance from the blade root.

The three heating elements are arranged such that in operation they can heat a region of the wind turbine rotor blade in order to prevent the formation of ice crystals and the deposition of relatively large quantities of ice. The region is located in particular at and close to a leading edge of the rotor blade, where the formation of ice crystals is most likely to occur. The heating elements can for example have a resistance wire, in particular made of copper or other suitable metals or metal alloys such as constantan, manganin or isotan.

The first heating element and the second heating element are embedded in a plastics matrix together with reinforcement fibers of the first and second rotor blade half shell, respectively, by curing a liquid plastics material. Embedded can mean that the heating elements are surrounded on all sides by the plastics material. Embodiments in which the heating elements form a surface of the rotor blade half shells and are adhesively bonded to the reinforcement fibers by the plastics material are also included. As a result of the embedding, the heating elements—in contrast to heating elements subsequently connected to a prefabricated rotor blade half shell—are integrated seamlessly into a surface contour of the rotor blade, and so the aerodynamic properties of the rotor blade are not impaired by the first and second heating element.

The heating elements can, for example, include a carbon fiber material. The carbon fiber material can be embedded in a plastics matrix, such that each heating element is made of carbon-fiber reinforced plastic (CFRP). The mentioned metallic heating elements can also be embedded in a plastics matrix. The carbon fiber material can be planar, in particular in the form of a thin material strip having a thickness of, for example, less than 1 mm or less than 0.5 mm.

The third heating element can be laminated or adhesively bonded to an outer side of the two rotor blade half shells. Laminating means that the heating element in question is attached to the outer side of the wind turbine rotor blade or to the outer side of the half shell in question in a dry state in which it is not yet saturated with liquid plastics material and is then saturated with the plastics material, for example by applying the liquid plastics material with a roller.

The two rotor blade half shells include a fiber-reinforced plastics material, it being possible for the reinforcement fibers to be for example glass fibers and/or carbon fibers. The liquid plastics material can be, for example, a polyester resin or epoxy resin. The two rotor blade half shells can also be designated pressure-side and suction-side rotor blade half shells or as lower shell and upper shell. They are assembled to form the rotor blade, in particular by adhesive bonding along the leading and trailing edges of the two half shells and/or by way of struts that extend in the longitudinal direction of the rotor blade or other elements of a supporting structure.

The fact that the third heating element is connected to a rotor blade half shell means that between the two there is either a direct connection—formed in particular by adhesively bonding the heating element to the rotor blade half shell—or that the heating element is directly connected to some other component which is to be assigned to the rotor blade half shell. For this consideration, in particular the first heating element is to be assigned to the first rotor blade half shell and the second heating element to the second rotor blade half shell. Thus, the third heating element is connected to the first rotor blade half shell in particular when it is directly connected to the first rotor blade half shell and/or to the first heating element. Similarly, the third heating element is connected to the second rotor blade half shell in particular when it is directly connected to the second rotor blade half shell and/or to the second heating element. By contrast, an only indirect connection between the third heating element and a particular rotor blade half shell via the respectively other half shell is not considered to be a connection within the meaning of the claim. For example, a third heating element adhesively bonded exclusively to the first rotor blade half shell would not be connected to the second rotor blade half shell.

The third heating element is arranged in particular in the region of a leading edge of the rotor blade. For example, it can cover an adhesive joint between a leading edge of the first rotor blade half shell and leading edge of the second rotor blade half shell.

The invention is based on the finding that the heating mats to be arranged in the form of a loop that are known from the state of the art can be fitted only after the two rotor blade half shells have been joined together, since they generally need to be connected to both rotor blade half shells in the desired arrangement in the region of the profile nose. However, fitting after the joining of the two rotor blade half shells is complicated, since the joined rotor blade half shells are difficult to handle and moreover a large surface region of the rotor blade has to be accessible. By contrast, in the case of the invention, the first heating element and the second heating element are already installed before the two rotor blade half shells are joined, specifically during the production of the rotor blade half shells. As a result, the advantages that result from manufacturing in half shells can also be exploited with a view to the fitting of the heating device. Merely the third heating element, which is intended to be connected to the two rotor blade half shells, is fitted only after the joining of the two rotor blade half shells. However, in particular when the third heating element is arranged in the region of the leading edge, only a relatively small surface region of the rotor blade has to be accessible for this purpose.

As a result of the electrical connection of the three heating elements at their blade tip ends, it is no longer necessary to redirect a heating mat in a transition region. This, too, simplifies production. However, the particular advantage of the loop-shaped heating mats known from the state of the art is maintained, because, as is the case as well, only the blade root ends of the three heating elements are to be provided with electrical connecting lines.

The invention provides for the blade root end of one of the heating elements to be connected to one pole of an electrical energy source and the two blade root ends of the two other heating elements to be connected to the other pole of the electrical energy source. This arrangement is equally suitable for an AC or DC energy supply. In both cases, the one heating element carries the sum of the electric current carried by the two other heating elements. As a result, the heat output can be concentrated at this one heating element. The one heating element can be in particular the third heating element arranged preferably in the region of a profile leading edge, so that the heat output is concentrated in this region.

It is possible to additionally influence the heat output from the individual heating elements through the selection of the electrical conductivities of the individual heating elements. For example, the electrical conductivity of the third heating element can be selected to be greater than the electrical conductivities of the first and second heating elements, for example by a factor of greater than or equal to 2. At a factor of 4, the one heating element has approximately the same heat output as that of the two heating elements connected in parallel.

In one embodiment, a section of the third heating element, which is connected to the first rotor blade half shell, and the first heating element are arranged in a partially overlapping manner, and/or a section of the third heating element, which is connected to the second rotor blade half shell, and the second heating element are arranged in a partially overlapping manner. The regions of overlap can extend in the longitudinal direction of the rotor blade and in the longitudinal direction of the respective heating elements. They can extend along the entire length of the respective heating elements or along a part thereof. The regions of overlap can have a uniform width of for example 1 cm to 20 cm, or account for up to for example 50% of the width of the third heating element. In the regions of overlap, the heating effect is strengthened. The heat output can therefore be used in a particularly targeted manner.

In one embodiment, the blade tip ends of the first heating element and/or of the second heating element and/or of the third heating element are in direct contact with one another. Direct electrical contact is established by this contact. To this end, it may be sufficient to laminate heating elements made of a carbon fiber material directly on top of one another onto the respective rotor blade half shells.

In one embodiment, the blade tip ends of the first, second and third heating elements are connected together in an electrically conductive manner via a connecting piece distinct from the heating elements. The connecting piece and the heating elements can be in direct contact with one another, such that there is electrical contact. By way of the connecting piece, even heating elements that are spaced apart from one another can be easily connected together in an electrically conductive manner. The connecting piece can likewise be laminated on.

In one embodiment, means for improving the electrical contact are arranged between the blade tip end of the third heating element on the one hand and the blade tip end of the first and/or second heating element on the other hand and/or between a blade tip end of one of the heating elements on the one hand and the connecting piece on the other hand. The means can be made of metal or of some other electrically conductive material. They may be metal filings, metal wires or a woven or laid fabric made of metal wires.

In one embodiment, as seen in cross section through the wind turbine rotor blade, the connecting piece is arranged outside the first heating element, outside the second heating element and inside the third heating element. For example, the connecting piece can be attached, for example by lamination, after the first heating element has been connected to the first rotor blade half shell and the second heating element has been connected to the second rotor blade half shell and after the joining of the two rotor blade half shells. Subsequently, the third heating element is attached to the connecting piece, in particular by lamination. In this way, the electrical connection between the three blade tip ends of the heating elements is established easily and reliably.

In one embodiment, the connecting piece includes a carbon fiber material. The carbon fiber material of the connecting piece can be embedded in a plastics matrix. The carbon fiber material can be a woven or laid fabric made of carbon fibers, as is also used as fiber reinforcement material for wind turbine rotor blades.

In one embodiment, an electrically insulating layer is arranged between the first and/or second heating element on the one hand and the third heating element on the other hand. The insulating layer can be for example a layer of a fiber-reinforced plastics material, in particular having glass fibers as reinforcement fibers. The insulating layer protects the first and second heating elements from damage and external influences. Furthermore, undesired electrical contact between these two heating elements and the third heating element is prevented. This is important in order that the current flows through the heating elements from their blade root ends to their blade tip ends. The electrically insulating layer prevents short circuits in particular in regions in which two heating elements overlap or adjoin each other.

In one embodiment, the electrically insulating layer has a cutout at the blade tip end of the first heating element and/or of the second heating element and/or of the third heating element. The cutout serves to establish an electrical connection between the blade tip ends of the heating elements, optionally via a separate connecting piece.

The abovementioned object is likewise achieved by a method for making a wind turbine rotor blade which includes a fiber-reinforced plastics material and an electrical heating arrangement having electrical connections at a blade root end. The method includes the following steps of:

producing a first rotor blade half shell from a fiber-reinforced plastics material, the first rotor blade half shell includes a first heating element having a blade root end and a blade tip end, wherein the first heating element and reinforcement fibers of the fiber-reinforced plastics material are embedded contemporaneously in a plastics matrix by curing a liquid plastics material;

producing a second rotor blade half shell from a fiber-reinforced plastics material, the second rotor blade half shell includes a second heating element having a blade root end and a blade tip end, wherein the second heating element and reinforcement fibers of the fiber-reinforced plastics material are embedded simultaneously in a plastics matrix by curing a liquid plastics material;

joining the first rotor blade half shell and the second rotor blade half shell;

connecting a third heating element which has a blade root end and a blade tip end to the first rotor blade half shell and to the second rotor blade half shell after the joining of the first rotor blade half shell and the second rotor blade half shell;

producing an electrical connection between the blade tip ends of the first, second and third heating elements; and, connecting the blade root ends of the first, second and third heating elements to corresponding ones of electrical connecting lines.

It is understood that the order of the steps can deviate to some extent therefrom. For descriptions of the features of the method, reference is made to the above descriptions of the features of the wind turbine rotor blade, which apply in a corresponding manner. This also applies to the further features and embodiments which were discussed in the description of the wind turbine rotor blade and can also be used in connection with the method according to the invention, and also to the listed advantages. The method can in particular be used for producing the wind turbine rotor blade according to the invention.

The two rotor blade half shells can be produced for example in a vacuum infusion process. Here, fiber materials are placed in a half-shell mold. The mold is closed in an airtight manner, for example by way of a vacuum film. Subsequently, the mold is evacuated and a liquid plastics material is passed into the mold through suction ducts until all of the cavities within the mold have been filled with the liquid plastics material. After the plastics material has cured, the fibers are embedded in a plastics matrix. In the invention, the connection of the first heating element and the second heating element to the first and second rotor blade half shell, respectively, is integrated into this production step, and so it is possible to dispense with a separate production step. A further simplification results from the fact that the heating elements can already be arranged easily in the desired manner when they are placed in the relevant mold. Furthermore, this also means that time is saved, because, unlike in the case of subsequent adhesive bonding, no additional time is required for curing of the plastic. Further advantages are the particularly firm and durable connection achieved in this way and also smooth surfaces.

In a subsequent method step, the two rotor blade half shells are joined, as already described in connection with the rotor blade.

The three heating elements are connected to the two half shells, as already described in detail in connection with the rotor blade.

An electrical connection between the blade tip ends of the first, second and third heating elements can likewise be established, as already described, that is, for example by direct contact or using a separate connecting piece.

In a further method step, the blade root ends of the first, second and third heating elements are connected to electrical connecting lines. The electrical energy can be supplied through these electrical connecting lines.

The method is particularly safe to carry out because the individual steps are simple, in particular the fitting of the individual heating elements. Particular difficulties which can arise from the loop-shaped profile of a heating mat in the method known from the state of the art do not occur.

In one embodiment, after the production of the first rotor blade half shell and the second rotor blade half shell, a connecting piece distinct from the heating elements is attached, the connecting piece connects the blade tip ends of the first, second and third heating elements together in an electrically conductive manner. Reference is made to the above descriptions of the connecting piece of the wind turbine rotor blade. The connecting piece can be attached after the two rotor blade half shells have been joined. The connecting piece can be attached before the third heating element is connected to the two half shells. After the third heating element has been attached, all three blade tip ends of the heating elements are connected together in an electrically conductive manner.

In one embodiment, before the third heating element is connected to the rotor blade half shells, an electrically insulating layer is attached, the electrically insulating layer at least partially covers the first heating element and/or the second heating element. In particular blade tip ends of the first and/or of the second heating element can be left uncovered.

In one embodiment, the electrically insulating layer is arranged during the production of the first rotor blade half shell and of the second rotor blade half shell. As a result, the attachment of the insulating layer can also be integrated into the production process of the individual rotor blade half shells.

In one embodiment, the electrically insulating layer has a layer of reinforcement fibers which are embedded in a plastics matrix contemporaneously with the reinforcement fibers of the first rotor blade half shell or of the second rotor blade half shell. The reinforcement fibers can, for example, be glass fibers or some other, electrically insulating fiber material. As a result, the production of the electrically insulating layer is integrated into the step of producing the respective rotor blade half shell, in a manner similar to that described above for the connection of the first and/or second heating element to the respective rotor blade half shell.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
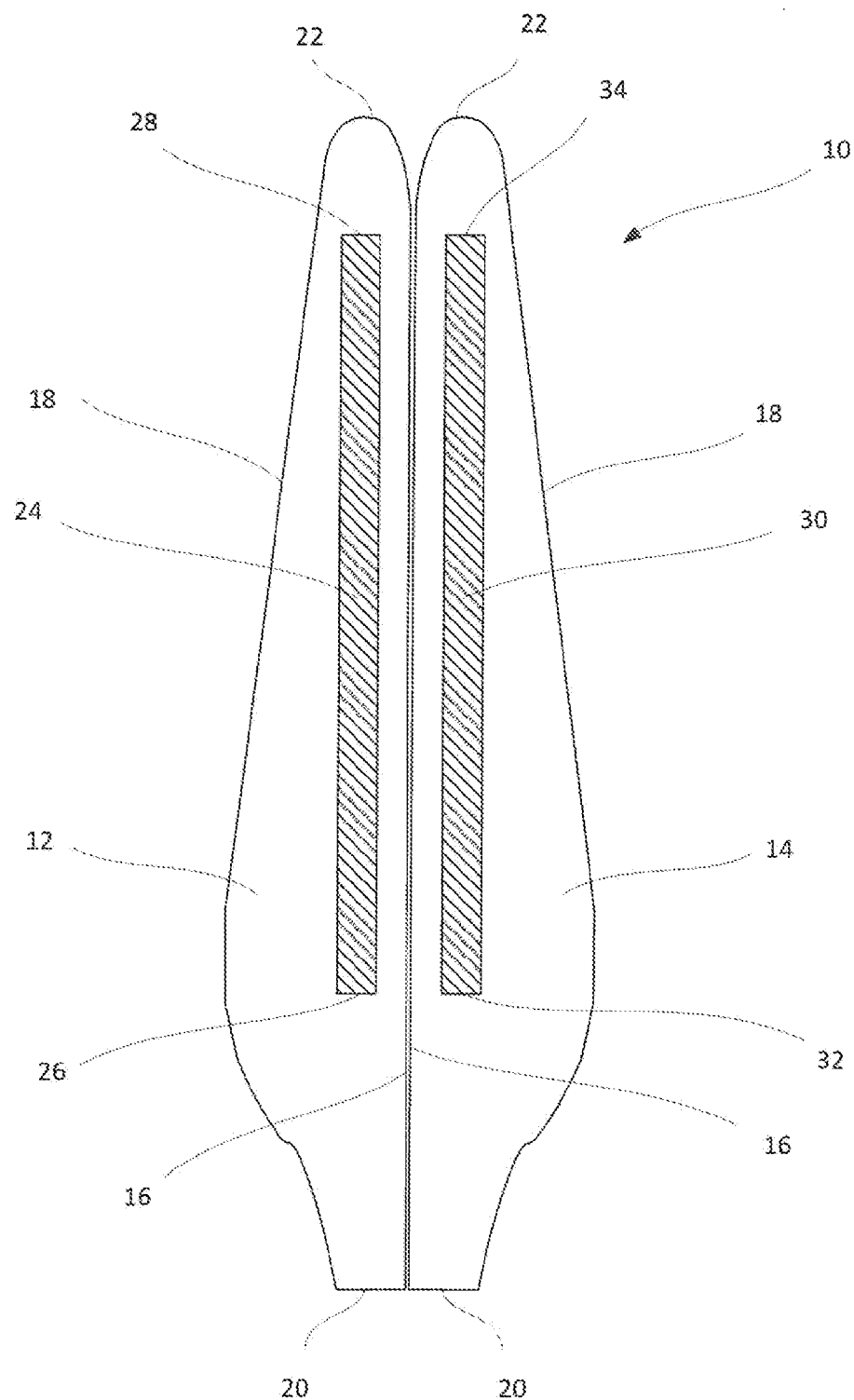
FIG. 1 shows a plan view of two rotor blade half shells arranged alongside one another, each having a heating element.

In FIG. 1, a first rotor blade half shell 12 and a second rotor blade half shell 14 are arranged next to each other. The two rotor blade half shells 12, 14 each have a leading edge 16 and a trailing edge 18 and also a blade root 20 and a blade tip 22.

Integrated into the first rotor blade half shell 12 is a first heating element 24, which has a blade root end 26 and a blade tip end 28. Integrated into the second rotor blade half shell 14 is a second heating element 30, which likewise has a blade root end 32 and a blade tip end 34. The two heating elements 24, 30 extend in the longitudinal direction of the respective rotor blade half shell 12, 14 and are each at a distance from the leading edge 16 thereof.

The first heating element 24 and the second heating element 30 are each made of a carbon fiber material which is embedded in a plastics matrix. They were produced together with the two rotor blade half shells 12, 14 in a vacuum infusion process.

Figure 2:
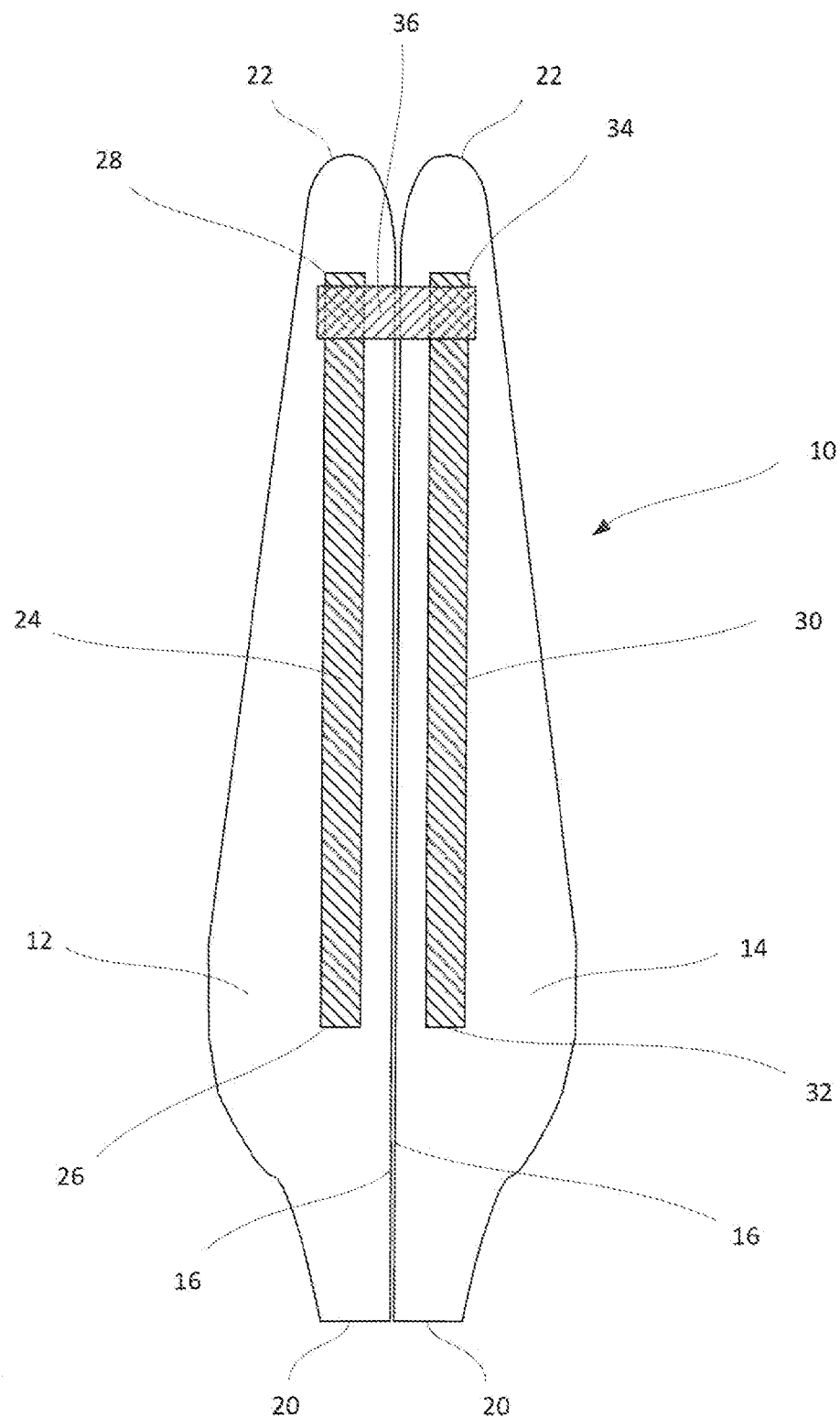
FIG. 2 shows the arrangement from FIG. 1 with a connecting piece which connects the blade tip ends of the two heating elements together.

In FIG. 2, the two rotor blade half shells 12, 14 are illustrated in the same arrangement as in FIG. 1, although they may already have been joined at the time of the illustrated method step. In addition to the components described in conjunction with FIG. 1, FIG. 2 shows a connecting piece 36 which establishes an electrically conductive connection between the blade tip end 28 of the first heating element 24 and the blade tip end 34 of the second heating element 30. The connecting piece 36 is made of a carbon fiber material laminated onto the first and second rotor blade half shells 12, 14.

Figure 3:
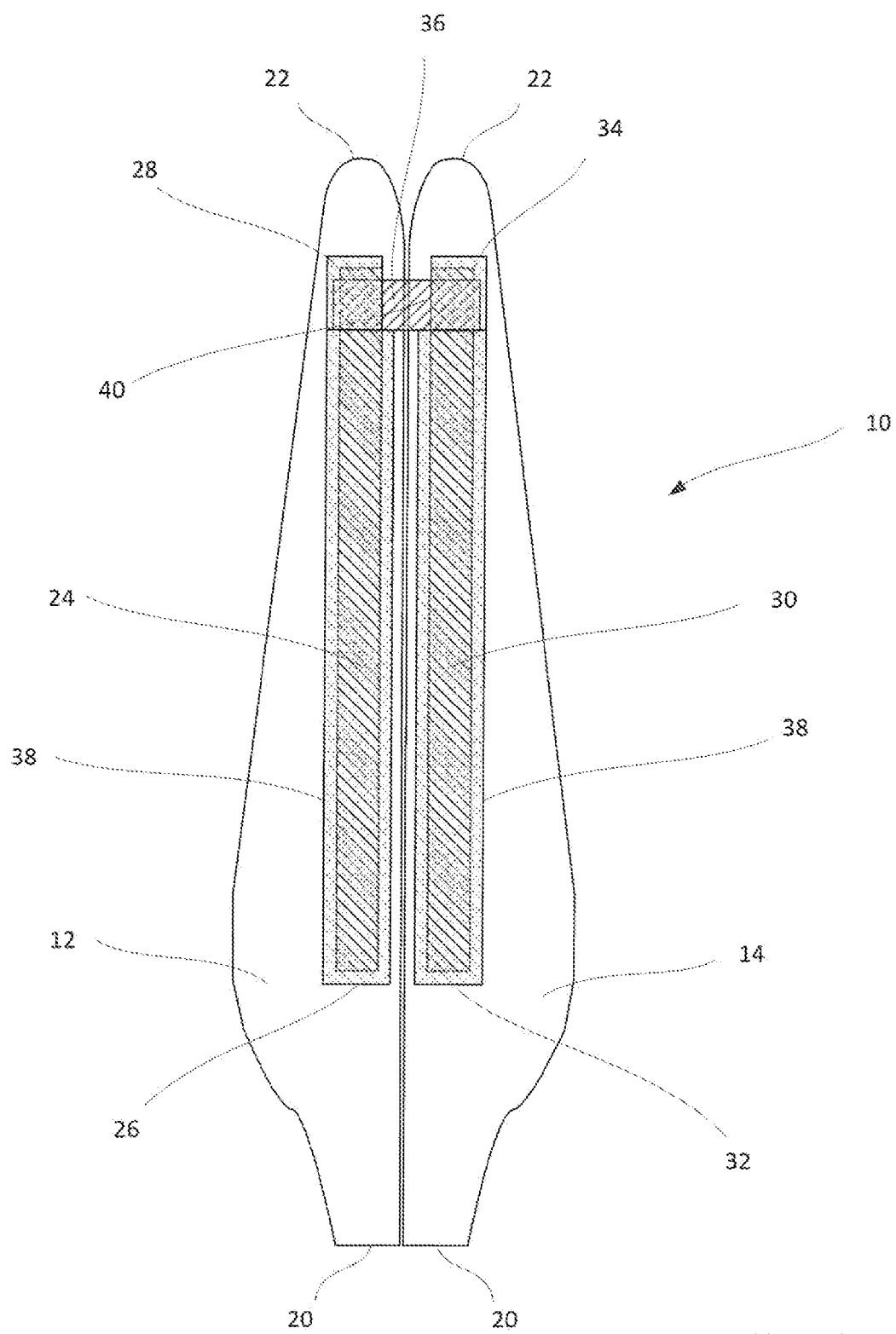
FIG. 3 shows the arrangement from FIG. 2 with an electrically insulating layer.

In addition to the elements in FIG. 2, FIG. 3 shows an electrically insulating layer 38 which completely covers the first heating element 24 and the second heating element 30. In the region of the connecting piece 36, between the blade tip end 28 of the first heating element 24 and the blade tip end 34 of the second heating element 30, the electrically insulating layer 38 has a cutout 40.

Figure 4:
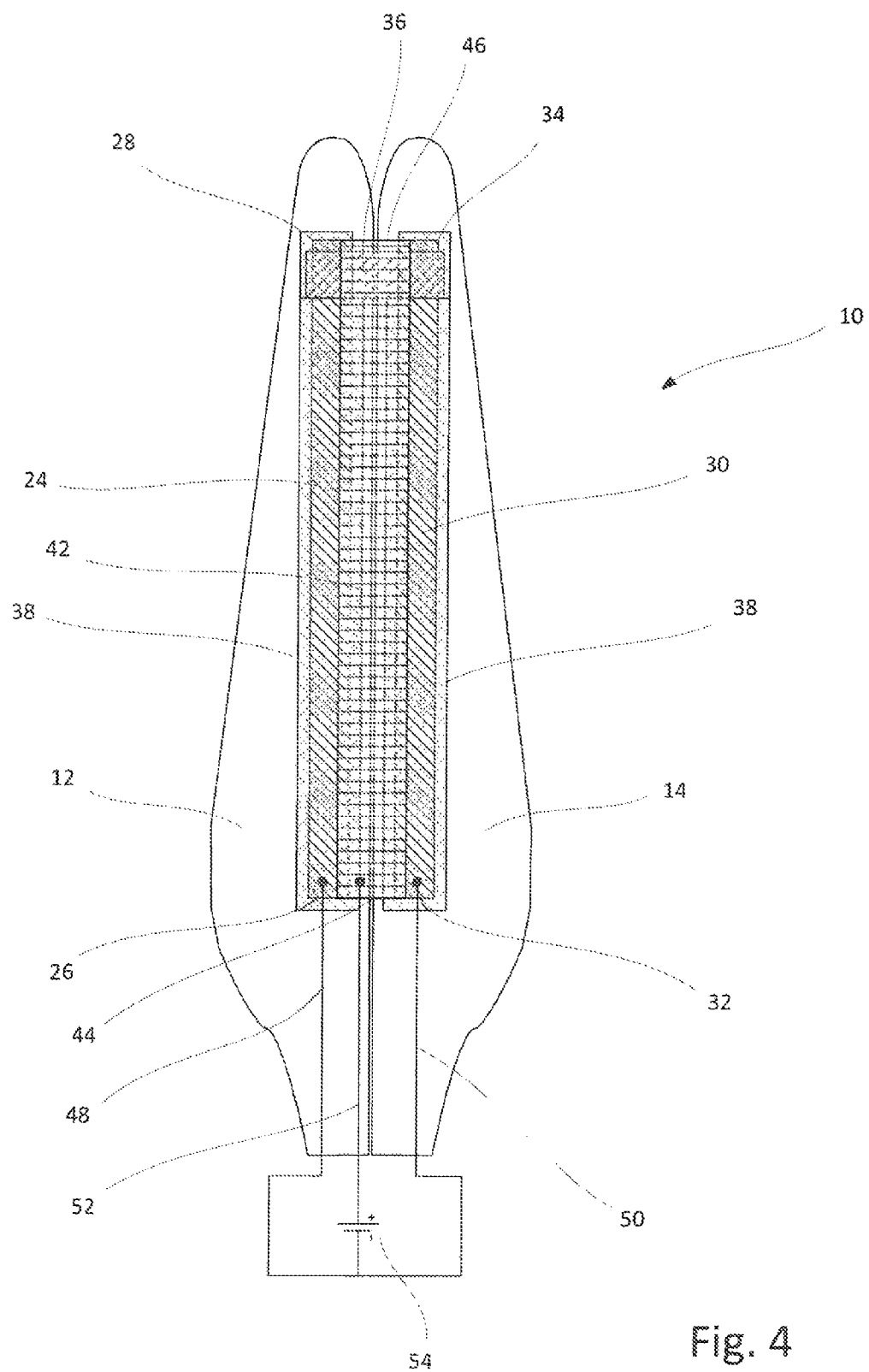
FIG. 4 shows the arrangement from FIG. 3 with a third heating element and a schematically indicated electrical energy supply; and, FIG. 5 shows a wind turbine rotor blade of the invention in cross section.

FIG. 4 additionally shows a third heating element 42, which is arranged in the longitudinal direction of the wind turbine rotor blade 10 in the region of the leading edge. The third heating element 42 covers an adhesive joint between the leading edges 16 of the first rotor blade half shell 12 and of the second rotor blade half shell 14. The third heating element 42 has a blade root end 44 and a blade tip end 46. The blade tip end 46 of the third heating element 42 is arranged in the region of the cutout 40 in the electrically insulating layer 38, such that it is in direct contact with the connecting piece 36 there. As a result, an electrical connection is established between the blade tip end 46 of the third heating element 42 and the connecting piece 36 and thus with the blade tip ends 28, 34 of the first and second heating elements 24, 30.

The blade root end 26 of the first heating element 24 is connected to an electrical connecting line 48, the blade root end 32 of the second heating element 30 is connected to an electrical connecting line 50 and the blade root end 44 of the third heating element 42 is connected to an electrical connecting line 52. The electrical connecting lines 48, 50 are connected to one pole of an electrical energy source 54. The electrical connecting line 52 is connected to the other pole of the electrical energy source 54. FIG. 4 shows a DC voltage source as electrical energy source 54. An AC voltage can be used equally well.

Figure 5:
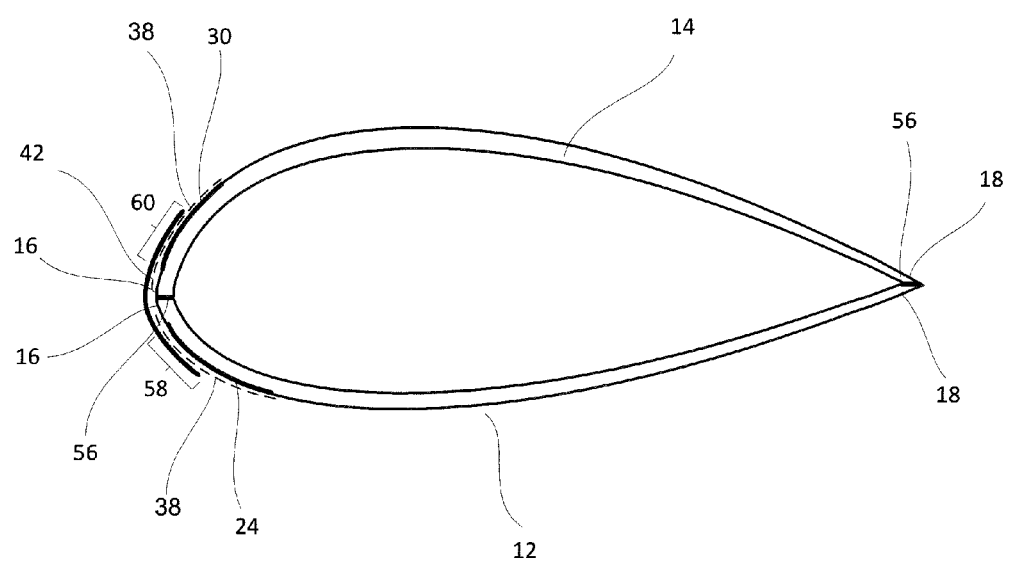

FIG. 5 shows the wind turbine rotor blade 10 from FIGS. 1 to 4 in cross section at a central longitudinal position of the three heating elements 24, 30, 42. The first rotor blade half shell 12 and the second rotor blade half shell 14 are discernible, each having a leading edge 16 and a trailing edge 18. The first rotor blade half shell 12 and the second rotor blade half shell 14 have been joined by way of adhesive 56 in the region of the leading edges 16 and trailing edges 18.

The first heating element 24 is located on an outer side of the first rotor blade half shell 12. The second heating element 30 is located on an outer side of the second rotor blade half shell 14. The first heating element 24 and the second heating element 30 are each at a distance from the leading edge 16 of the respective rotor blade half shells 12, 14.

Located in cross section outside the first heating element 24 and the second heating element 30 is an electrically insulating layer 38 made of a plastics material reinforced with glass fibers. The electrically insulating layer 38 was embedded in a plastics matrix together with the other reinforcement fibers of the respective rotor blade half shells 12, 14 and the relevant heating element 24, 30 in a vacuum infusion process. To this end, these materials were placed in a vacuum mold. This production process manifests itself in the fact that the surface formed by the electrically insulating layer 38 and the laterally adjoining parts of the rotor blade half shells 12, 14 is smooth, corresponding to the surface of the vacuum mold used.

Arranged in cross section again outside the electrically insulating layer 38 is the third heating element 42, which is connected both to the first rotor blade half shell 12 and to the second rotor blade half shell 14. It is laminated onto the two interconnected rotor blade half shells 12, 14.

A section 58 of the third heating element 42 overlaps the first heating element 24 and a section 60 of the third heating element 42 overlaps the second heating element 30.

It is understood that the foregoing description is that of the preferred embodiments of the invention and that various changes and modifications may be made thereto without departing from the spirit and scope of the invention as defined in the appended claims.

LIST OF REFERENCE NUMERALS

10 Wind turbine rotor blade
12 First rotor blade half shell
14 Second rotor blade half shell
16 Leading edge
18 Trailing edge
20 Blade root ends of the rotor blade half shells
22 Blade tip ends of the rotor blade half shells
24 First heating element
26 Blade root end of the first heating element
28 Blade tip end of the first heating element
30 Second heating element
32 Blade root end of the second heating element
34 Blade tip end of the second heating element
36 Connecting piece
38 Electrically insulating layer
40 Cutout
42 Third heating element
44 Blade root end of the third heating element
46 Blade tip end of the third heating element
48 Electrical connecting line of the blade root end of the first heating element
50 Electrical connecting line of the blade root end of the second heating element
52 Electrical connecting line of the blade root end of the third heating element
54 Electrical energy source
56 Adhesive
58 Section of the third heating element which overlaps the first heating element
60 Section of the third heating element which overlaps the second heating element

What is claimed is:

1. A wind turbine rotor blade comprising:
a first rotor blade half shell made of fiber-reinforced plastics material;
a second rotor blade half shell made of fiber-reinforced plastics material;
said first and said second rotor blade half shells conjointly defining a blade root;
a fiber-reinforced plastics material;
a heating arrangement having a first heating element, a second heating element and a third heating element, a blade root end and electrical connections at said blade root end;
an electrically insulating layer arranged between said third heating element and at least one of said first heating element and said second heating element;
each one of said first, second and third electrical heating elements having a blade root end and a blade tip end;
said first electrical heating element being embedded in a plastics matrix simultaneously with reinforcement fibers of said first rotor blade half shell by curing a liquid plastics material during the production of said first rotor blade half shell;
said second electrical heating element being embedded in a plastics matrix simultaneously with reinforcement fibers of said second rotor blade half shell by curing a liquid plastics material during the production of said second rotor blade half shell;
said third heating element being connected to said first and said second rotor blade half shells;
a first section of said third heating element and a section of said first heating element being arranged in a partially overlapping manner and a second section of said third heating element and a section of said second heating element being arranging in a partially overlapping manner;
said blade tip ends of said first, said second and said third electrical heating elements being interconnected in an electrically conductive manner;
said heating arrangement further including first, second and third electrical connecting lines corresponding to respective ones of said first, second and third heating elements; and,
the blade root ends of said first, said second and said third electrical heating element being connected to corresponding ones of said first, second and third electrical connecting lines.

2. The wind turbine rotor blade of claim 1, wherein:
said third heating element has a first section connected to said first rotor blade half shell; and,
said first heating element and said first section of said third heating element mutually overlap.

3. The wind turbine rotor blade of claim 2, wherein:
said third heating element has a second section connected to said second rotor blade half shell; and, said second heating element and said second section of said third heating element mutually overlap.

4. The wind turbine rotor blade of claim 1, wherein:
said third heating element has a second section connected to said second rotor blade half shell; and,
said second heating element and said second section of said third heating element mutually overlap.

5. The wind turbine rotor blade of claim 1, wherein said blade tip ends of said first, said second and said third heating element are in direct contact with each other.

6. The wind turbine rotor blade of claim 1 further comprising a connecting piece configured to electrically interconnect said blade tip ends of said first, said second and said third heating elements.

7. The wind turbine rotor blade of claim 6, further comprising means for improving electrical contact between said blade tip end of said third heating element and one of said blade tip ends of said first and said second heating elements.

8. The wind turbine rotor blade of claim 6, further comprising means for improving electrical contact between said connecting piece and at least one of said blade tip ends of said first, said second and said third heating element.

9. The wind turbine rotor blade of claim 6, wherein said connecting piece is arranged outside said first heating element and said second heating element and inside said third heating element as seen in cross section through said wind turbine rotor blade.

10. The wind turbine rotor blade of claim 6, wherein said connecting piece includes a carbon fiber material.

11. The wind turbine rotor blade of claim 1, wherein said electrical insulating layer defines a cutout at said blade tip end of at least one of said first heating element, said second heating element, and said third heating element.

12. A method for making a wind turbine rotor blade having fiber-reinforced plastics material and an electrical heating arrangement having electrical connections at a blade root end, said method comprising the steps of:
producing a first rotor blade half shell from a fiber-reinforced plastics material, the first rotor blade half shell including a first heating element having a blade root end and a blade tip end, wherein said producing step includes simultaneously embedding the first heating element and the reinforcement fibers of the fiber-reinforced plastics material in a plastics matrix by curing a liquid plastics material;
producing a second rotor blade half shell from a fiber-reinforced plastics material, the second rotor blade half shell including a second heating element having a blade root end and a blade tip end, wherein the producing step includes embedding the second heating element and the reinforcement fibers of the fiber-reinforced plastics material in a plastics matrix by curing a liquid plastics material;
mutually joining the first rotor blade half shell and the second rotor blade half shell;
thereafter connecting a third heating element, which has a blade root end and a blade tip end, to the first rotor blade half shell and to the second rotor blade half shell;
making an electrical connection between the blade tip ends of the first, second and third heating elements;
arranging an electrically insulating layer so as to at least partially cover at least one of the first and the second heating element before said connecting of said third heating element to said first and second rotor blade half shells;
arranging a first section of said third heating element and a section of said first heating element in a partially overlapping manner and a second section of said third heating element and a section of said second heating element in a partially overlapping manner; and,
providing electrical connecting lines and connecting the blade root ends of the first, second and third heating elements to corresponding ones of said electrical connecting lines.

13. The method of claim 12, further comprising the step of attaching a connecting piece to electrically interconnect the blade tip ends of the first, second and third heating elements after said production of the first and second rotor blade half shells.

14. The method of claim 12, wherein said arranging of said electrically insulating layer is done during said production of said first rotor blade half shell and said production of said second rotor blade half shell.

15. The method of claim 14, wherein said electrically insulating layer has a layer of reinforcement fibers which are embedded in a plastic matrix simultaneously with the reinforcement fibers of the first rotor blade half shell or of the second rotor blade half shell.

16. The wind turbine rotor blade of claim 1, wherein:
one of said first, second and third electrical connecting lines is electrically connected to a first pole of an electrical power source, and
two other of said first, second and third electrical connecting lines are electrically connected to a second pole of the electrical power source.

17. The method of claim 12, further comprising:
electrically connecting one of said first, second and third electrical connecting lines to a first pole of an electrical power source; and,
electrically connecting two other of said first, second and third electrical connecting lines to a second pole of the electrical power source.

* * * * *